United States Patent [19]

Specht et al.

[11] 4,076,571
[45] Feb. 28, 1978

[54] METHOD OF BONDING ELECTROLYTIC DIAPHRAGMS OF PERFLUOROSULFONIC ACID RESINS

[75] Inventors: Steven J. Specht, Cleveland; John O. Adams, Englewood, both of Tenn.

[73] Assignee: Olin Corporation, New Haven, Conn.

[21] Appl. No.: 733,733

[22] Filed: Oct. 19, 1976

[51] Int. Cl.² .................. B32B 7/04; B32B 17/04; B32B 27/06
[52] U.S. Cl. .................. 156/305; 156/307; 204/296; 260/79.3 MU; 264/232; 428/421
[58] Field of Search .................. 156/305–307, 156/278, 280, 94; 428/421, 422; 260/79.3 M, 79.3 MU, 79.7; 264/232, 233, 340; 204/282, 295, 296

[56] References Cited

U.S. PATENT DOCUMENTS

| | | | |
|---|---|---|---|
| 3,718,627 | 2/1973 | Grot | 260/79.3 MU |
| 3,852,135 | 12/1974 | Cook et al. | 156/94 |
| 3,925,135 | 12/1975 | Grot | 156/306 |
| 3,963,817 | 6/1976 | Ballain | 264/232 |

*Primary Examiner*—William A. Powell
*Assistant Examiner*—John E. Kittle
*Attorney, Agent, or Firm*—James B. Haglind; Donald F. Clements; Thomas P. O'Day

[57] ABSTRACT

A method of restoring elasticity to heat sealed portions of an electrolytic diaphragm comprised of a perfluorosulfonic acid resin in the alkali metal ion form comprises contacting the heat sealed sections with an aqueous fluid.

12 Claims, No Drawings

METHOD OF BONDING ELECTROLYTIC DIAPHRAGMS OF PERFLUOROSULFONIC ACID RESINS

This invention relates to the bonding of diaphragms for electrolytic cells. More particularly the invention relates to the heat sealing of ion exchange resins employed as diaphragms in electrolytic cells.

In the use of the diaphragm materials in electrolytic cells for the electrolysis of aqueous solutions such as alkali metal chlorides, it is frequently necessary to bond sections of these materials to fabricate forms which can be readily installed in an electrolytic cell. One known method of bonding which is employed with plastic materials is heat sealing.

Also known are diaphragm materials composed of perfluorosulfonic resins which are suitably used in electrolytic processes such as the electrolysis of sodium chloride to produce chlorine and sodium hydroxide.

In the bonding together of two sections of certain of these persulfonic acid resin diaphragms, for example, by heat sealing, it has been found that the bonded portions suffer losses in elasticity and become embrittled. This embrittlement prevents the bonded materials from being handled without danger of splitting or cracking and rendering the diaphragms useless for electrolytic processes.

It is an object of the present invention to provide a method which eliminates the harmful embrittlement produced during the heat sealing of perfluorosulfonic acid resin diaphragms.

Another object of the present invention is a method for heat sealing porous persulfonic acid resin diaphragms which permits normal handling of the diaphragm after bonding.

These and other objects of the invention are accomplished in a method for heat sealing an electrolytic diaphragm comprised of a perfluorosulfonic acid resin in the alkali metal ion form, said process comprising heat sealing juxtaposed sections of said electrolytic diaphragm, the improvement which comprises contacting said heat sealed sections of said electrolytic diaphragm with an aqueous fluid to restore elasticity of said heat sealed sections.

A suitable diaphragm is comprised of a solid perfluorosulfonic acid resin reinforced by a screen of a suitable metal or a fabric such as polyfluoroolefin cloth. The perfluorosulfonic acid resins are preferably hydrolyzed copolymers of a fluorinated vinyl compound and fluorosulfonated perfluorovinyl ether. Suitable fluorinated vinyl compounds include vinyl fluoride, hexafluoropropylene, vinylidene fluoride, trifluoroethylene, chlorotrifluoroethylene, perfluoro(alkylvinyl ether), tetrafluoroethylene and mixtures thereof. Preferred fluorinated vinyl compounds are tetrafluoroethylene and hexafluoropropylene, with tetrafluoroethylene being particularly preferred.

The fluorosulfonated perfluorovinyl ethers are compounds of the formula $CF_2=CFOR_fSO_2F$ wherein $R_f$ is a bifunctional perfluorinated radical comprising one to eight carbon atoms. The $R_f$ radical of the formula above can be either branched or unbranched, i.e., straight chain and can have one or more ether linkages.

Illustrative of such fluorosulfonated perfluorovinyl ethers are:

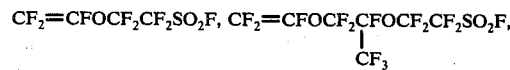

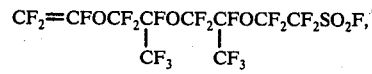

$CF_2=CFCF_2CF_2SO_2F$, and

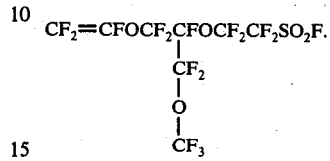

The most preferred fluorosulfonated perfluorovinyl ether is perfluoro(3,6-dioxa-4-methyl-7-octenesulfonyl fluoride),

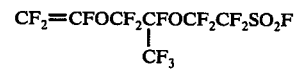

The fluorosulfonated perfluorovinyl ethers are disclosed in such references as U.S. Pat. No. 3,282,875, to Connolly et al, U.S. Pat. No. 3,041,317, to Gibbs et al, U.S. Pat. No. 3,560,568, to Resnick and in U.S. Pat. No. 3,718,627 to Grot.

The hydrolyzed copolymers are prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962, that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0°–200° C. and at pressures in the range 1–200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like.

Aqueous techniques for preparing the hydrolyzed copolymers include contacting the monomers with an aqueous medium containing a free-radical initiator to obtain a slurry of polymer particles in nonwater-wet or granular form, as disclosed in U.S. Pat. No. 2,393,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example in U.S. Pat. No. 2,559,752, issued to K. L. Berry on July 10, 1951, and U.S. Pat. No. 2,593,583, issued to J. F. Lontz on Apr. 22, 1952.

The $FSO_2$ group of the solid persulfonic acid resin is converted to an $SO_3H$ group or a sulfonate group (such as an alkali metal sulfonate) or a mixture thereof. The equivalent weight of the perfluorocarbon copolymer ranges from about 900 to about 1,600, and preferably from about 1,100 to about 1,500. The equivalent weight is defined as the average molecular weight per sulfonyl group.

In a preferred embodiment, the resin films are combined with a support material, for example, by lamination. Suitable support materials include fabrics of perfluoroolefins such as polytetrafluoroethylene and hexafluoropropylene or fabrics of tetrafluoroethylene/hexafluoropropylene copolymers.

A suitable process for combining the resin film with the support material is described, for example, in U.S. Pat. No. 3,925,135, issued to Grot in which a perfluorosulfonic resin film is contacted with a perfluoroolefin fabric and a differential pressure applied to the contacted film and fabric while heating the film and the fabric at from about 240°–320° C. The pressure applied to the opposite surface of the fabric from that which is contacting the film being less than the pressure on the surface of the film contacting the fabric. Further details of the laminating process are given in U.S. Pat. No. 3,925,135, the entire specification of which is incorporated by reference.

Particularly preferred diaphragms are those fabricated from perfluorosulfonic acid produced by E. I. duPont de Nemours and Co. and sold commercially under the trademark "Nafion". The diaphragms may be membranes or porous diaphragms.

These perfluorosulfonic acid resins have a stable acid form and a stable alkali ion form. The acid form is obtained, for example, by boiling the resin in hydrochloric acid for a short period. An alkali metal ion form can similarly be obtained by heating the resin in an alkali metal hydroxide solution.

The alkali metal ion form of the perfluorosulfonic acid resin may be suitably selected from any of the alkali metals including lithium, sodium, potassium, rubidium, and cesium. It may be desirable to select the alkali metal ion form of the resin to correspond to the alkali metal of the chloride solution being electrolyzed. Thus, the sodium form of the persulfonic acid resin can be employed when the electrolyte is sodium chloride. For economic reasons sodium or potassium are preferred ion forms.

In the electrolysis of alkali metal chloride solutions, such as those employed in the anode compartment of a diaphragm cell, it has been discovered that the alkali metal ion form of the perfluorosulfonic acid resin has greater dimensional stability than the acid form of the resin. Therefore, prior to use as a diaphragm, the perfluorosulfonic acid resin is converted to the alkali metal ion form.

One suitable physical form of the diaphragm is that obtained when two sections of the perfluorosulfonic acid resin are joined together to form an "envelope" which is opened at one end. The "envelope" is slipped over an electrode having a "finger-like" shape and then closed, for example, by clamping means to seal the electrode within the diaphragm.

In forming the envelope, two sections of the perfluorosulfonic acid resin diaphragm material in alkali metal ion form are joined by heat sealing the edges. In heat sealing, corresponding edges of each of the two sections are contacted and inserted in a heat sealing apparatus. In the heat sealing apparatus, heat and pressure are applied to the edges and a bond formed between them.

During the heat sealing operation of the perfluorosulfonic acid resin diaphragm described above, temperatures of from about 200° C. to about 370° C. and pressures of from about 1 to about 10 kg/cm$^2$ are quite suitable.

After removal from the heat sealing apparatus the areas of the diaphragm which have been heat sealed are contacted with an aqueous fluid. This restores elasticity to the heat sealed areas and prevents them from becoming embrittled and cracking when the diaphragm is handled. Suitable aqueous fluids include water, for example, in the liquid or gaseous form and aqueous solutions containing, for example, ethyl alcohol, alkali metal chlorides or alkali metal hydroxides. The concentration of water in the solutions should be at least about 10 and preferably at least about 50 percent by weight of the solution.

The aqueous fluid can be applied in any manner which suitably moistens the heat sealed areas.

At room temperature, for example, a contact time of the aqueous fluid with the heat sealed area of about 2 minutes is quite satisfactory. At elevated temperatures such as 80° C., less than 1 minute of contact time is required.

The method of the present invention is illustrated by the following examples without any intention of being limited thereby. All parts and percentages are by weight unless otherwise specified.

EXAMPLE 1

A diaphragm for an electrolytic cell for the production of chlorine and caustic soda by the electrolysis of sodium chloride was constructed from two sections of a microporous material. The material was a laminate of a homogeneous film of a perfluorosulfonic acid resin and a tetrafluoroethylene support fabric. The resin was a copolymer of tetrafluoroethylene and perfluoro(3,6-dioxa-4-methyl-7-octenesulfonyl fluoride) having an equivalent weight of about 1100, the equivalent weight being defined as the average molecular weight per sulfonyl group. The film had a thickness of about 7 mils and was laminated to a polytetrafluoroethylene support fabric identified as T-900G. The perfluorosulfonic acid diaphragm material, in the potassium salt form, was supplied by E. I. duPont de Nemours and Co. under the trademark Nafion 710X. Two sections of the diaphragm material were placed with the support fabric sides of the diaphragm material in contact with each other. A portion of the edges along one side of the sections was placed on the heating strips of a thermal impulse heat sealer (Vertrod Corp., Brooklyn, N.Y.). The edges were heat sealed at a temperature of about 360° C. and a pressure of about 5 kilograms per square centimeter. for about 4 seconds. Following removal of the heat sealed portion from the sealing apparatus, the heat sealed portion was wiped with a wet cloth for about two minutes. The diaphragm material was similarly heat sealed along a portion of two other sides to form an envelope and the heat sealed portions wiped with a wet cloth. This treatment enabled the diaphragm to be handled without danger of cracking or splitting at the heat sealed areas.

EXAMPLE 2

The heat sealing procedure of Example 1 was repeated and the heat sealed areas wiped with cloth soaked with an aqueous solution containing 50 percent ethyl alcohol. No indications of embrittlement in the heat sealed areas were noted and the diaphragm could be handled immediately without cracking occurring.

EXAMPLE 3

The heat sealing procedure of Example 1 was repeated and the heat sealed area contacted with steam for about 5 seconds. The heat sealed areas were free of any evidence of embrittlement.

EXAMPLE 4

A persulfonic acid membrane diaphragm in the form of an envelope was formed from two sheets of a homogeneous film 7 mils thick of 1200 equivalent weight perfluorosulfonic acid resin laminated with a polytetrafluoroethylene fabric (E. I. duPont de Nemours & Co. Nafion ® Membrane 427). Prior to heat sealing, the sheets were boiled in a 5 percent aqueous solution of sodium chloride for about 1 hour to convert the resin to the sodium ion form. After drying, the two sheets were heat sealed at a temperature of about 360° C. and a pressure of about 5 kilograms per square centimeter for about 4 seconds. Following heat sealing, the heat sealed portion was wiped with a wet cloth for about two minutes. No evidence of cracking or splitting of the heat sealed areas was noted during subsequent installation of the diaphragm in an electrolytic cell.

EXAMPLE 5

A perfluorosulfonic acid membrane diaphragm was removed from an electrolytic cell after evidence was found that a leak had developed. The double ply membrane (E. I. duPont de Nemours & Co. Nafion ® 391) in the sodium form was repaired by heat sealing the hole using the procedure of Example 4. The heat sealed area was wiped with a moist cloth to prevent cracking.

What is claimed is:

1. In a method for heat sealing an electrolytic diaphragm comprised of a perfluorosulfonic acid resin in the alkali metal ion form, said method comprising heat sealing juxtaposed sections of said electrolytic diaphragm, the improvement which comprises contacting said heat sealed sections of said electrolytic diaphragm with an aqueous fluid to restore elasticity to said heat sealed sections.

2. The method of claim 1 in which said aqueous fluid is water.

3. The method of claim 1 in which said aqueous fluid is steam.

4. The method of claim 1 in which said aqueous fluid is a solution containing at least 10 percent by weight of water.

5. The method of claim 4 in which said aqueous fluid is a solution of ethyl alcohol.

6. The method of claim 2 in which said perfluorosulfonic acid resin is comprised of a hydrolyzed copolymer of a perfluoroolefin and a fluorosulfonated perfluorovinyl ether of the formula $CF_2=CFOR_fSO_2F$ where $R_f$ is a bifunctional perfluorinated radical having from 1 to about 8 carbon atoms; and said hydrolyzed copolymer having an equivalent weight of from about 900 to about 1,600.

7. The method of claim 6 in which said alkali metal is sodium or potassium.

8. The method of claim 7 in which said fluorosulfonated perfluorovinyl ether is perfluoro (3,6-dioxa-4-methyl-7-octenesulfonyl fluoride).

9. The method of claim 6 in which said perfluorosulfonic acid resin is attached to a polytetrafluoroethylene support material.

10. A method for heat sealing two sections of an electrolytic diaphragm material comprised of a hydrolyzed copolymer of a perfluoroolefin and a fluorosulfonated perfluorovinyl ether of the formula $CF_2=CFOR_fSO_2F$ where $R_f$ is a bifunctional perfluoroalkyl radical having from 1 to about 8 carbon atoms, said hydrolyzed copolymer having an equivalent weight of from about 900 to about 1,600, said hydrolyzed copolymer being in the alkali metal ion form, said method comprising:

(a) contacting two juxtaposed sections of said diaphragm materials, (b) applying heat under controlled conditions to said sections to provide a temperature of from about 200° to about 370° C., (c) applying pressure to said heated sections of from about 1 to about 10 kg/cm² to heat seal said sections, and (d) contacting said heat sealed sections with an aqueous fluid.

11. The method of claim 10 in which said aqueous fluid is water.

12. The method of claim 11 in which said fluorosulfonated perfluorovinyl ether is perfluoro(3,6-dioxa-4-methyl-7-octenesulfonyl fluoride) and said alkali metal is sodium or potassium.

* * * * *